Figure 1:
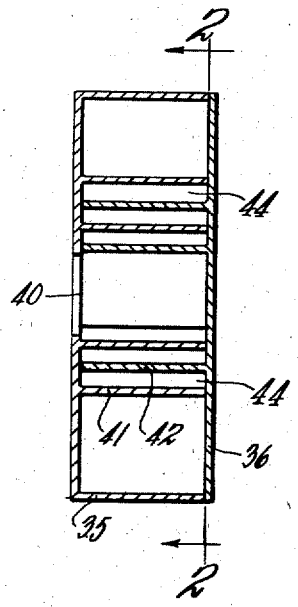

H. P. MAXIM

SILENCER

May 21, 1929.

Re. 17,299

Original Filed March 23, 1922

INVENTOR
Hiram Percy Maxim
BY Chapin & Neal
ATTORNEY

Reissued May 21, 1929. Re. 17,299

UNITED STATES PATENT OFFICE.

HIRAM PERCY MAXIM, OF HARTFORD, CONNECTICUT, ASSIGNOR TO THE MAXIM SILENCER COMPANY, OF HARTFORD, CONNECTICUT, A CORPORATION OF CONNECTICUT.

SILENCER.

Original application filed March 23, 1922, Serial No. 546,126. Divided and application filed October 1, 1926, Serial No. 138,996. Original No. 1,636,238, dated July 19, 1927. Application for reissue filed March 15, 1928. Serial No. 261,967.

The present invention relates to silencers or mufflers such as are used in connection with gas or oil engines to reduce the noise of the exhaust or in connection with various kinds of steam and pneumatic machinery for deadening the discharge or intake noises thereof.

The invention is particularly directed to improvements in the type of silencers described generally in my Patent 1,611,475 granted December 21, 1926, of which this present application is a division.

One object of the invention is to provide a muffler or silencer of the general character above mentioned which will effectively perform its functions without creating back pressure.

To this end, the invention contemplates broadly the provision, in an exhaust or intake silencer, of a silencing conduit constructed and arranged to obstruct the escape of the sound waves without throttling the flow of the sound propagating medium.

In carrying out this feature of this invention, the silencing conduit is made to comprise at least one section, the walls of which are shaped in accordance with the principles of Venturi tube construction to provide a gradually contracting portion and a gradually expanding portion, the former being arranged to discharge into the latter. As the exhaust gases pass through a conduit constructed in this manner, the sound waves which strike the tapering walls of the contracting portions are reflected backwardly, and are trapped and as a result only such sound waves escape as pass directly through the small end of the contracted portion without striking against the converging walls thereof. By reason of the Venturi action of the expanding or diverging portion of the conduit, the velocity of the gases is increased in the restricted portion to such an extent that the volume of flow per unit of time of said gases or propagating medium is not materially reduced and consequently the discharge capacity of the conduit is not reduced and no undesirable back pressure is created.

Another object of the invention is to provide certain new and useful improvements in silencers tending to simplify their construction, increase their efficiency and reduce the cost of their manufacture.

With these latter objects in view, as will appear from the following description, the invention further consists in the features of construction and in the combinations and arrangements of parts hereinafter described and claimed, the advantages of which will be apparent to those skilled in the art.

Figure 2:
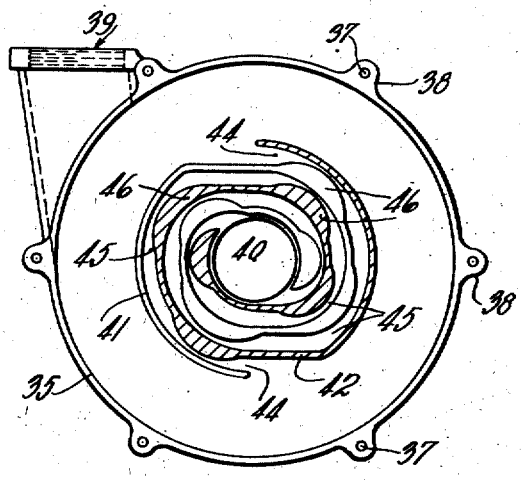

In the accompanying drawings:

Fig. 1 is a cross-sectional view of a silencer embodying the present invention; and Fig. 2 is a section on line 2—2 of Fig. 1.

Referring to the drawings, the silencer or muffler therein illustrated comprises a cylindrical casing consisting of a body portion 35 and a cover plate 36 which are rigidly secured together by means of bolts 37, the latter extending through outwardly projecting ears 38 on the body and cover plate. The body portion of the muffler casing is provided with a peripheral inlet spud 39 and with an axial outlet orifice 40. The interior of the muffler casing is provided with two intertwining generally scroll-shaped ribs 41 and 42 which extend from the cover plate 36 of the cylindrical muffler casing to the end wall of the body portion 35 and are so arranged as to afford two separate spiral or involute passages 44 leading inwardly to the central portion of the casing and through which the incoming exhaust gases must pass in order to reach the outlet orifice 40. To facilitate the casting of the spiral ribs 41 and 42, the rib 41 is made integral with the body of the casing 35 while the rib 42 is made integral with the cover plate 36, this expedient providing for sufficient space between the ribs of each casting to insure that the ribs will draw properly from the sand of the mold.

To effect the trapping of the sound waves without retarding the flow of the sound propagating medium, each spiral passage 44 is provided with a series of Venturi sections 45 each of which is formed by means of a convexly curved lateral projection 46 upon one of the opposed spiral ribs which form the opposite side walls of the passageway. The Venturi sections 45 have substantially the same effect upon the exhaust gases and sound waves as the Venturi sections described in connection with the silencer described in my Patent 1,611,475 granted December 21, 1926, hereinbefore mentioned. By providing a practical way of embodying Venturi sections in a silencing conduit of spiral form, a considerable economy of space is effected. The particular construction described is of extremely simple and rugged construction and is inexpensive to manufacture, the muffler comprising only two castings which are bolted together.

It will be understood that the invention may be embodied in various other forms than that shown and that many changes in the details of construction and arrangement of parts may be resorted to without departing from the spirit and scope of the invention as hereinafter claimed.

What I claim is:

1. A silencer comprising, a cylindrical casing having a peripheral and an axial opening therein, a silencing conduit of spiral form within said casing extending between said openings, said conduit having a succession of contracting and expanding sections distributed throughout its length to form a series of Venturi-like passageways therein.

2. A silencer comprising, a pair of castings each having an integral spiral flange extending from a side face thereof, said castings being secured together with said flanges in opposed intertwined relation, said flanges coacting with the opposed side faces to provide two spiral silencing conduits leading outwardly from an axial chamber, and projections on said flanges cooperating with the adjacent flanges to provide a series of contracting and expanding sections of Venturi-like character in said conduit.

3. A silencer comprising, a pair of castings each having an integral spiral flange extending from a side face thereof, said castings being secured together with said flanges in opposed intertwined relation, said flanges coacting with the opposed side faces to provide two spiral silencing conduits leading outwardly from an axial chamber, and projections on said flanges cooperating with the adjacent flanges to provide a series of contracting and expanding sections of Venturi-like character in said conduit, one of said castings having an outer circular flange integral therewith and coacting with said other casting to provide an annular chamber surrounding said spiral conduits, said circular flange having an opening therein for the introduction of the exhaust gases.

4. A silencer comprising, an annular casting having an integral peripheral flange and an integral spiral flange extending from a side face thereof, a disk-shaped casting having an integral spiral flange extending from a side face thereof, said castings being secured together with said spiral flanges in opposed intertwined relation, said spiral flanges coacting with the opposed side faces to provide a central chamber having an axial opening and two spiral silencing conduits leading outwardly from said chamber, said circular flange coacting with said disk-shaped casting to provide an annular chamber surrounding said spiral conduits, and convex projections on said spiral flanges cooperating with the adjacent flanges to provide a series of contracting and expanding sections of Venturi-like character in said conduits.

5. A silencer comprising a conduit of involute form having a succession of contracting and expanding sections distributed throughout its length constructed and arranged to trap the sound waves without impeding the flow of exhaust gases.

6. A silencer comprising a pair of end members, a plurality of intertwined involute partitions spaced apart between said end members to provide spiral silencing conduits leading outwardly from a central receiving chamber, a plurality of convex projections on said partitions cooperating with the adjacent partitions to provide contracting and enlarging sections in said conduits to trap the sound waves without impeding the flow of exhaust gases.

7. A silencer comprising a plurality of spirally arranged overlapping conduits each provided with at least one Venturi-like contracted portion.

8. A silencer comprising a plurality of spirally arranged overlapping conduits each having an alternating succession of Venturi-like restricted portions and enlarged expansion chambers.

In testimony whereof I have affixed my signature.

HIRAM PERCY MAXIM.